United States Patent [19]

Marks et al.

[11] 4,171,149

[45] Oct. 16, 1979

[54] WHEEL TRIM RETENTION MEANS

[75] Inventors: Harold C. Marks, Northville; James E. Gillespie, Westland, both of Mich.

[73] Assignee: Norris Industries, Inc., Ypsilanti, Mich.

[21] Appl. No.: 857,582

[22] Filed: Dec. 5, 1977

Related U.S. Application Data

[63] Continuation of Ser. No. 648,395, Jan. 12, 1976, abandoned.

[51] Int. Cl.² .............................................. B60B 7/06
[52] U.S. Cl. ............................ 301/37 P; 301/37 R; 301/37 B; 24/73 HC
[58] Field of Search ............... 301/37 R, 37 P, 37 B, 301/37 T, 37 PB, 37 TP, 37 CD, 37 C, 108 R, 108 A; 24/73 HC, 73 B; 29/159 A

[56] References Cited

U.S. PATENT DOCUMENTS

| | | | |
|---|---|---|---|
| 3,043,632 | 7/1962 | Walner | 301/37 R |
| 3,095,241 | 6/1963 | Fitzgerald | 301/37 R |
| 3,265,441 | 8/1966 | Baldwin | 301/37 P |
| 3,970,346 | 7/1976 | Kretschmer | 301/37 R |
| 3,973,801 | 8/1976 | Beisch et al. | 301/37 R X |

FOREIGN PATENT DOCUMENTS

| | | | |
|---|---|---|---|
| 1015295 | 7/1952 | France | 301/37 R |
| 854833 | 11/1960 | United Kingdom | 301/37 R |

*Primary Examiner*—Robert J. Spar
*Assistant Examiner*—Charles A. Marmor
*Attorney, Agent, or Firm*—Harness, Dickey & Pierce

[57] ABSTRACT

This invention pertains to an improved light duty retention clip particularly suited for use in retaining automotive wheel covers, trim rings, and the like. The invention employs structure which provide an improved two point attachment to the wheel trim. The outer attachment comprises a flange at the clips' outer edge over which the outer edge of the wheel trim may be crimped, and the inner edge of the clip has a pair of integrally formed fingers which wrap around and grip an inner edge forming part of trim, thereby affording a two-point attachment. The clip also has a resilient biting member extending radially outward between the pair of gripping fingers for engaging the axial flange portion of a wheel rim to retain the wheel trim thereon. An embossed protrusion on the clip may be provided to give the resilient biting member stiffness and to aid in dispersing the retention forces over the entire surface area of the clip. Because the clip does not require any rivets or other piercing attachment devices to secure it to the wheel trim it is ideally suited for use with plastic wheel trim and/or trim having plastic or reduced-gauge metal backing rings.

20 Claims, 6 Drawing Figures

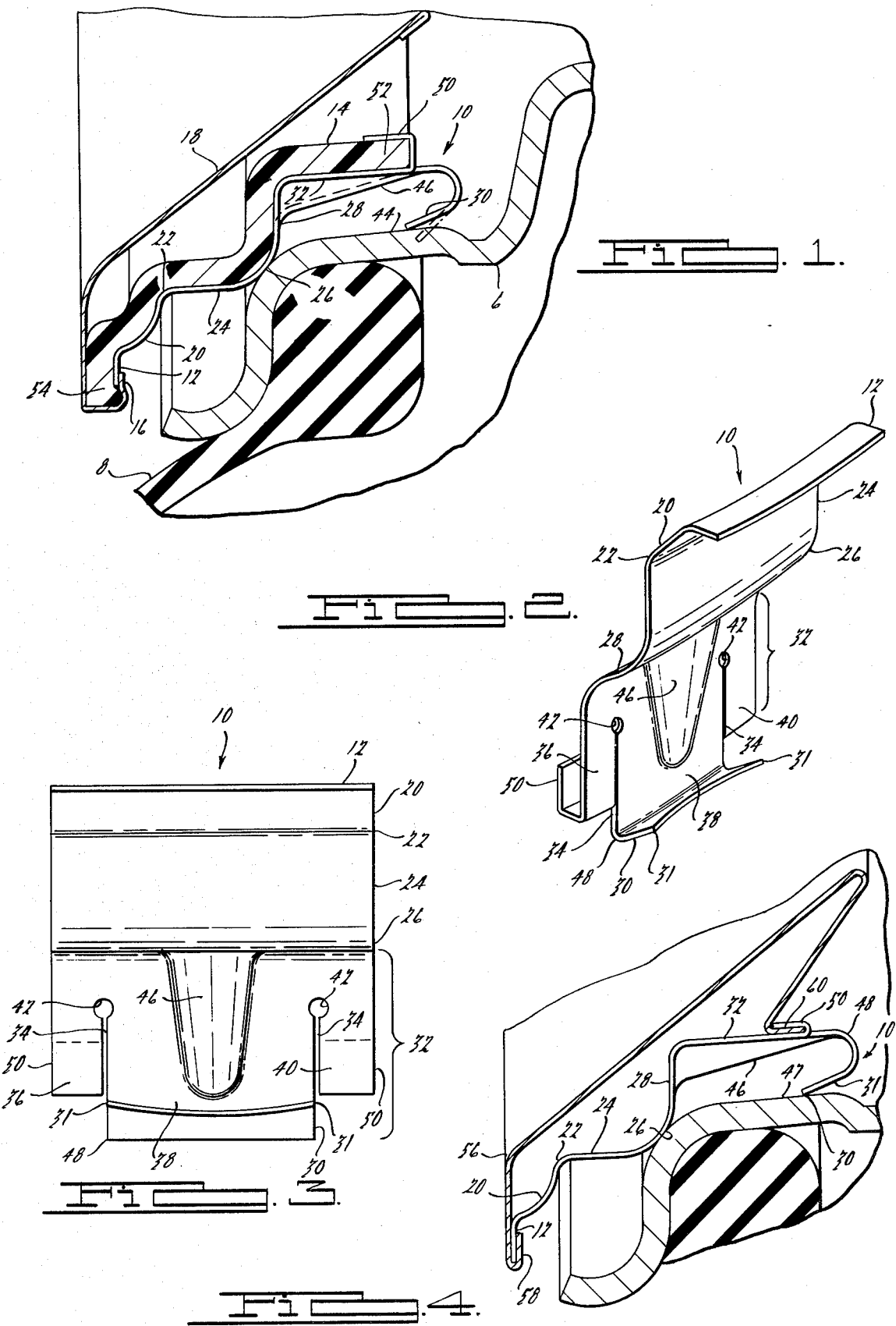

WHEEL TRIM RETENTION MEANS

This is a continuation, of application Ser. No. 648,395, filed Jan. 12, 1976, now abandoned.

BACKGROUND AND SUMMARY OF THE INVENTION

Wheel covers and trim rings have long been in use on motor vehicles both to protect and decorate the wheel. One of the major problems associated with wheel trim has been to design reliable and inexpensive retention means to removably secure the trim to the wheel. In use, wheels are subjected to environmental extremes, substantial vibration, etc., and yet the retention means must still permit the trim to be easily removed. Compounding this problem is the desire to keep the cost of the trim as low as possible, to minimize interference with the aesthetic design of the trim, and to prevent annoying rattling of relative rotation of the wheel and its trim.

One technique employed to secure wheel trim utilizes a ring containing a plurality of biting members cantilevered from the trim at its outer edge. The lack of backing ring or lower attachment point in this cantilevered arrangement permits the possibility of the biting members becoming deformed due to rough handling and/or extended use, thereby lessening the gripping force exerted by the teeth.

On trim having a backing ring, retention members are often attached by crimping the edge of the trim over upper and lower edges of the retention member. This thus creates a more secure and durable retention means but increases the cost due to the necessity of two crimping operations.

A third arrangement comprises riveting or welding a toothed member to a backing ring. Again, this poses an additional manufacturing step, thus increasing costs, and also requires a relatively heavy gauge metal backing ring to retain the rivets, etc.

It is, therefore, a primary objective of the present invention to provide improved means for retaining wheel trim which will reliably handle light weight trim and which is extremely economical to manufacture.

It is a further object of the present invention to provide an improved economical means for attaching retention clips to wheel trim, which also results in a simplification of assembly procedures.

It is still a further object of the present invention to provide improved means for retaining a wheel trim or the like utilizing a plastic backing ring.

It is still a further object of the present invention to provide improved means for retaining wheel trim or the like utilizing a reduced gauge metal backing ring.

These and other objects, features and advantages of the present invention will become apparent from the subsequent description and the appended claims, taken in conjunction with the accompanying drawings.

BRIEF DESCRIPTION OF THE DRAWINGS

FIG. 1 is a sectional view of a wheel trim retention system embodying the principles of the present invention, utilizing a plastic wheel trim backing member, the section being taken on a radial plane passing through the rotational axis of the wheel;

FIG. 2 is a perspective view of the clip of FIG. 1;

FIG. 3 is a view of the clip of FIG. 1 looking from the side which engages the wheel;

FIG. 4 is a sectional view similar to FIG. 1 showing an embodiment of the present invention applied to a metal trim ring without a backing ring;

DETAILED DESCRIPTION

Figure 5:
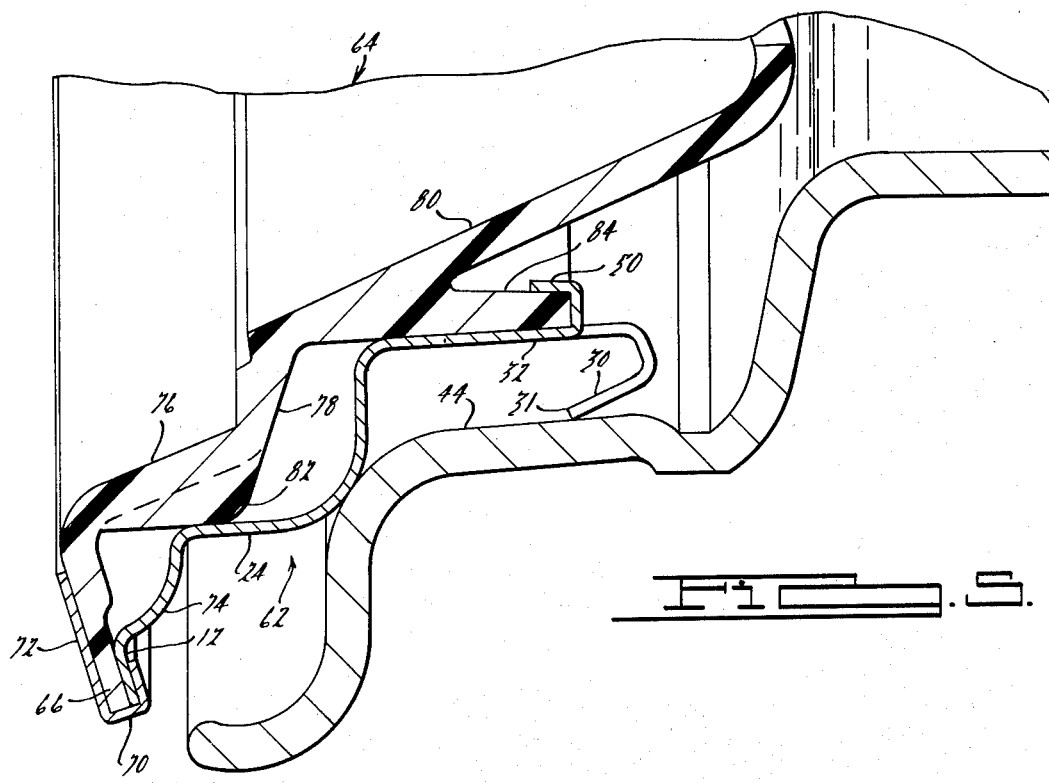
FIG. 5 is a sectional view similar to FIG. 1 showing another embodiment of the present invention applied to a plastic trim ring without a backing ring.

Referring now to the drawings, and particularly FIG. 1, a sectional portion of a conventional flanged wheel rim 6 is shown, having a tire 8 mounted thereon. As depicted, wheel rim 6 rotates about a horizontal axis (not shown). A retaining clip, generally indicated at 10, is shown in engaging relationship to wheel rim 6. The clip comprises a main body portion of the shape shown, and has at the outer axial end thereof a radially extending flange portion 12. The flange portion engages a backing ring 14 and is secured thereto by crimping the peripheral edge 16 of an ornamental wheel trim member 18 over the backing ring and against flange portion 12.

Adjacent and inboard of flanged portion 12, the clip has a generally curved portion 20 extending both axially and radially inwardly and terminating at a shoulder 22 which faces axially outwardly and radially inwardly. Extending axially inwardly from this shoulder is a wall section 24 which terminates at a second shoulder 26 which faces axially inwardly and radially outwardly. Wall section 24 is of a length sufficient to suspend flanged portion 12 away from the wheel rim and allow room for the placement of wheel weights, as well as for the insertion of pry bars for removing the wheel trim member.

In use, shoulder 26 engages the standard shoulder on the wheel, as best shown in FIG. 1. This shoulder-to-shoulder engagement of the wheel and clip serves to position the wheel trim in relation to the wheel, both radially and axially. In addition, this shouler will insure that the backing ring is maintained in the desired slightly spaced apart relationship to the wheel. Toothed portion 30, hereinafter described in detail, retains this shoulder portion in contact with the shoulder of the wheel thus preventing rattling of the clip and wheel.

The clip has a second wall portion 28 extending radially inwardly from shoulder 26 a distance sufficient to provide clearance for toothed member 30. At the radially inward end of the second wall portion 28, the main body portion of the clip has a generally right-angled bend and extends radially inwardly therefrom. This radially inwardly extending portion, indicated at 32, contains two axial slits 34 which divide inward extension 32 into three segments 36, 38 and 40. The slits formed in the clip each terminate at a round aperture 42 to prevent crack propagation when stressed.

Center segment 38 of extension 32 is bent outwardly at an obtuse angle to form toothed member 30 and contains teeth 31 at the end thereof adapted to engage flange 44 on a motor vehicle wheel in a resilient biting relationship. The other two segments 36 and 40 are formed in a generally "U" shape toward the side of the clip facing away from the wheel flange, thus forming a pair of fingers. The clip also has a stiffening embossed portion 46 centrally disposed on center segment outward to and partially including radially extending wall 28 of positioning shoulder 26.

In one embodiment of the invention, a backing ring 14 is incorporated into the completed structure. The backing ring may be formed of any relatively rigid material such as a thin gauge metal or plastic; however, the absence of rivets or other piercing and/or clamping type clip attachment means makes the invention ideally suited for use with a backing ring formed of plastic. Plastic offers the advantages of low cost and flexibility in the shapes to which it may be easily molded, including a contour substantially conforming to that of the clip as shown in FIG. 1 which will function to distribute the forces transmitted by the clip to the backing ring over the entire surface area of the clip, thus minimizing the possibilities of localizing breaking, cracking or tearing of the backing ring. While the use of a plastic backing ring offers substantial cost savings in both forming operations and materials, the clip as described herein is also well suited for use with reduced-gauge metal backing rings, with a resultant savings in material cost and ease of forming, due to its integral second point attachment means and dispersion of stresses over a greater surface area.

In assembling the clip to the backing ring, lower gripping fingers 50 are first slid over the inward peripheral edge of the ring indicated at 52. The upper flange 12 of the clip will then be positioned on a mating flange 54 of backing ring 14. A plurality of these clips will be assembled to the backing ring in like manner with fingers 50 holding each in place with a slight pinching action. An ornamental member 18 is then secured in place by rolling, curling or crimping the peripheral edge 16 thereof over the backing ring flange so that it engages and secures clip flange 12 and backing ring flange 54 together, as best shown in FIG. 1.

This arrangement thus provides a secure two-point attachment of the clip to the backing ring without the need for a second crimping operation or the use of rivets or the like. The absence of these additional fasteners not only reduces the number of machine operations in the manufacturing cycle, but also, as previously mentioned, enables the use of plastic or very-thin metal backing rings, neither of which could adequately retain a rivet or the like. Further, because the outer crimped attachment is the primary attachment, fingers 50 need not tightly grasp the backing ring. A very slight pinching action is sufficient. This is particularly important when a plastic backing ring is used because plastics are generally incapable of withstanding constant stress over an extended time period, especially when also subjected to extreme vibration and temperature range.

The fact that the clip is not cantilevered from ornamental member 18 is another reason the backing ring may be fabricated from thinner gauge metal than might otherwise be used, or from plastic. Further, because the clip is secured both at its outer and inner edges, a narrower flange area may be employed, thus allowing a greater freedom of design for the wheel trim member.

Referring now to FIG. 4, another embodiment of the invention is shown in which the clip is connected directly to a metal trim ring 52 without using a backing ring. The clip is secured to ring 56 by crimping, rolling or curling outer peripheral edge 58 of the ring 56 over clip flange 12. Trim ring 56 has a lower axially inwardly extending flange 60 which may be integrally formed thereon. The lower fingers 50 grip flange 60 thereby affordng the second point of the two-point attachment.

It should also be noted that the trim ring 56 referred to above could be used as a retention band for a decorative wheel trim device. In those applications in which ring 56 is a retention band, rather than as a trim ring, a decorative covering may be secured thereto in any suitable manner to complete the wheel trim device.

Figure 6:
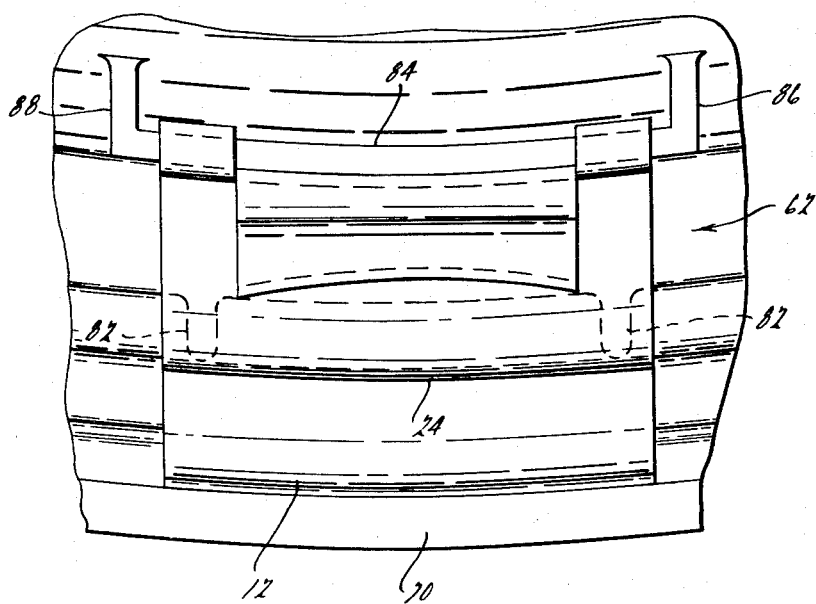
FIG. 6 is a view of the clip of FIG. 5 looking axially outwardly (i.e., to the left in FIG. 5) showing part of the wheel trim.

Referring now to FIGS. 5 and 6, a third embodiment of the invention is shown in which the clips are secured directly to a plastic wheel trim without use of a backing ring. As best shown in FIG. 5, a clip, indicated generally at 62, is substantially the same as that previously described, with two exceptions. Firstly, clip 62 does not have the embossed portion 46 of clip 10 shown in FIGS. 1 through 4, and secondly, as best shown in FIG. 6, clip 62 does not have any apertures as shown at 42 on clip 10 in FIGS. 2 and 4, although if desired both these features could be added to clip 62. Because clips 10 and 62 are substantially identical except for the above two exceptions, like portions are indicated by the same reference numbers previously used.

In the embodiments of FIGS. 5 and 6 a plastic wheel trim member 6, which may be a wheel cover, has a flange portion 66 which engages flange portion 12 of clip 62. A metal ornamental member 70 is crimped, rolled, curled or otherwise formed over the wheel trim member flange 66 and clip flange 12 thereby securing them together. Ornamental member 70 has a radially inwardly extending portion 72 the axial outward face of which may be finished in any manner desired so as to present an overall aesthetically pleasing appearance. Wheel trim member 64 also has a shoulder 74 disposed on flange portion 66 which limits the radially inward travel of clip flange 12 should the connection loosen, thus preventing flange 12 from slipping out of engagement with ornamental member 70.

Wheel trim member 64 has an axially and radially inwardly extending portion 76 connected to flange portion 66, a radially inwardly extending portion 78 connected to portion 76, and a second axially and radially inwardly extending portion 80 connected to portion 78, as best shown in FIG. 5. It should be noted that the general shape of wheel trim member 64 as described above and as shown in FIG. 5 is illustrative only, and the scope of this invention is not so limited. Axially inwardly extending portion 76 of wheel trim member 64 has a pair of spaced apart protrusions 82 extending radially outwardly and contacting wall section 24 of clip 62, as best seen in FIG. 6. Protrusions 82 serve to prevent or limit deformation of clip 62 in a radially inwardly direction. Protrusions 82 may also be in the form of a ridge extending the full width of the clip or a continuous circumferential ridge formed on wheel trim member 62, as desired.

Portion 80 of wheel trim member 64 has a flange portion 84 integral therewith and extending axially inwardly a predetermined distance at an acute angle to portion 80. Flange portion 84 may be either continuous around the circumference of wheel trim member 64, or discontinuous being formed only at points where clips are to be attached. When flange portion 84 is discontinuous, side wall portions 86 and 88 may be added between flange 84 and portion 80 of wheel trim member 64 to impart greater strength to flange 84. Flange portion 84 is of a width slightly greater than that of clip 62 and engages clip wall portion 32 to limit the radially inward deformation of clip 62 and to insure sufficient biting force is exerted by toothed member 30 against wheel flange 44.

Assembly of clip 62 to wheel trim member 64 is the same as previously described. Gripping fingers 50 of clip 62 are slid over the axially inner edge of flange portion 84 and exert a slight pinching action thereon. Flange 84 is of a length so as to fully engage gripping fingers 50 and allow clip flange portion 12 to rest against wheel trim member flange 66.

Clip 62, like clip 10, employs a second integral attachment means which retains the clip in position when the wheel trim member is removed from the wheel, as well as dispersing the retention forces over a greater surface area. These features make this clip ideally suited for use with wheel trim members formed of plastic or relatively thin gauge metal. Also, because the second attachment means is integral to the clip only a single manufacturing operation is required for assembly. Substantial savings in material and manufacturing costs are thus realized, while providing a superior retention device for light duty application.

Thus, there is disclosed in the above description and in the drawings an improved wheel trim retention system and clip which fully and effectively accomplish the objectives hereof. However, it will be apparent that variations and modifications of the disclosed embodiments may be made without departing from the principles of the invention or the scope of the appended claims.

We claim:

1. Wheel trim means for a wheel comprising:
   an ornamental trim member;
   retention means integrally formed on said trim member defining a generally axially inwardly extending flange portion;
   a plurality of clips circumferentially spaced around the outside of said trim member and means affixing the outer portion of each said clips to said trim member adjacent the outer periphery thereof;
   auxiliary attachment means integral with each said clips and including at least one pair of opposed fingers, one of said fingers being disposed radially inwardly from another of said fingers and said fingers resiliently grasping said flange portion in a non-biting relationship therebetween; and
   a toothed member integral with said clip and adapted to bitingly engage said wheel, said clip engaging the radially outer surface of said flange portion so as to aid said biting engagement of said toothed member with said wheel when said wheel trim means is assembled thereto.

2. Wheel trim means as claimed in claim 1, wherein the outer periphery of said trim member is crimped over said outer portion of each said clip to affix the two together.

3. Wheel trim means as claimed in claim 1, wherein said ornamental trim member is a trim ring.

4. Wheel trim means as claimed in claim 1, wherein said ornamental trim is a wheel cover.

5. Wheel trim means as claimed in claim 1, wherein said retention means is formed of plastic.

6. Wheel trim means as claimed in claim 1, wherein said retention means is formed of sheet metal.

7. Wheel trim means as claimed in claim 1, wherein said auxiliary attachment means includes two pairs of opposed fingers arranged to resiliently grasp said flange portion.

8. Wheel trim means as claimed in claim 1, wherein said retention means and each said clip have complementary configurations with each said clip disposed in a back-to-back relationship with said retention means.

9. Wheel trim means as claimed in claim 1, wherein said retention means includes a protrusion engaging each said clip to reduce relative movement between said clip and said retention means.

10. Wheel trim means as claimed in claim 1, wherein said axially inwardly extending flange portion on said ornamental trim member comprises a plurality of discrete circumferentially spaced flange portions each of which is provided with a single one of said clips.

11. Wheel trim means as claimed in claim 1, wherein said axially inwardly extending flange portion is of continuous annular configuration.

12. A clip for securing ornamental wheel trim to a wheel, comprising:
    a body portion extending generally axially and radially inwardly from the outer periphery of the wheel trim;
    integral flange means at the outer end of said body portion affixed to the wheel trim;
    a pair of resilient opposed fingers integral with said body portion and disposed at the inner end thereof, one of said fingers extending radially inwardly and axially outwardly from said body portion and being sized so as to resiliently grasp a portion of the wheel trim in a non-biting relationship;
    an integral retention member extending generally radially and axially outwardly from said body portion and having an outer edge arranged to bitingly engage said wheel when said clip and ornamental wheel trim are assembled to a wheel; and
    an integral shoulder portion engageable with a portion of said wheel to position said wheel trim with respect to said wheel.

13. A clip as claimed in claim 12, wherein two of said pairs of resilient opposed fingers are provided on each clip.

14. A clip as claimed in claim 13, wherein one of said pairs of opposed fingers is circumferentially spaced from the other of said pairs of opposed fingers.

15. A clip as claimed in claim 12, wherein said portion of said wheel trim extends in a generally axial direction and the pinching force exerted by said opposed fingers is in a generally radial direction.

16. A clip as claimed in claim 12, wherein said retention member is resiliently deflectable with respect to said body portion.

17. A clip as claimed in claim 12, wherein said retention member is resiliently deflectable with respect to said opposed fingers.

18. A clip as claimed in claim 12, wherein said body portion is provided with at least one reinforcing ridge.

19. A clip as claimed in claim 12, wherein said shoulder portion is adapted to engage the wheel to axially and radially locate the wheel trim thereon.

20. A clip as claimed in claim 12, wherein said retention member incorporates a reinforcing ridge thereon to increase the stiffness thereof.

* * * * *